United States Patent [19]

Weinert, Jr. et al.

[11] Patent Number: 4,625,002

[45] Date of Patent: Nov. 25, 1986

[54] BINUCLEAR CATALYST FOR THE PREPARATION OF POLYAMIDE

[75] Inventors: Raymond J. Weinert, Jr., Garfield Heights; Kenneth C. Benton, Macedonia; Michael J. Desmond, Cleveland Heights; Lawrence E. Ball, Cuyahoga Falls; Barbara D. Curatolo, Maple Heights, all of Ohio

[73] Assignee: The Standard Oil Company, Cleveland, Ohio

[21] Appl. No.: 455,149

[22] Filed: Jan. 3, 1983

[51] Int. Cl.⁴ .................... C08F 4/00; C08G 69/00; C08G 69/16; C08G 69/28
[52] U.S. Cl. ...................................... 526/90; 526/135; 526/147; 526/311; 528/271; 528/310; 528/319; 528/323; 528/363; 528/336
[58] Field of Search ............... 528/319, 363, 271, 310, 528/323, 336; 526/311, 317, 135, 147, 90

[56] References Cited

U.S. PATENT DOCUMENTS

| | | | |
|---|---|---|---|
| 2,691,643 | 10/1954 | Chirtel et al. | 260/78 |
| 2,749,331 | 6/1956 | Breslow | 260/89.7 |
| 3,458,474 | 7/1969 | Wilhelm et al. | 528/319 |
| 3,499,879 | 3/1970 | Kobayashi et al. | 260/88.7 |
| 3,629,203 | 12/1971 | Volker et al. | 260/78 A |
| 3,705,134 | 12/1972 | James | 528/319 |
| 3,740,379 | 6/1973 | Sebenda et al. | 528/319 |
| 3,922,254 | 11/1975 | Hedrick et al. | 528/319 |
| 4,283,524 | 8/1981 | Greene | 528/363 |

Primary Examiner—Harold D. Anderson
Attorney, Agent, or Firm—David P. Yusko; John E. Miller; Larry W. Evans

[57] ABSTRACT

A process for producing polyamides comprising contacting a polyamide forming system with a transition metal complex catalyst at a temperature sufficient to cause polymerization. The transition metal complex catalysts are at least one binucleating ligand attached to at least one transition metal containing nucleus.

27 Claims, No Drawings

BINUCLEAR CATALYST FOR THE PREPARATION OF POLYAMIDE

BACKGROUND OF THE INVENTION

1. Field of Invention

This invention relates to a catalyst for the preparation of polyamides. More specifically this invention relates to binuclear metal complex catalysts useful in the preparation of polyamides. In one embodiment, these binuclear metal complex catalysts are employed in the preparation of nylon-3 polymers and copolymers.

2. Description of the Prior Art

Polyamides are polymers which contain recurring amide groups as integral parts of the main polymer chain. Polyamides are generally formed by condensation polymerization or by addition polymerization. The parameters for these processes as well as the specific monomers suitable for polyamide formation are known to those skilled in the art.

Polyamides are frequently referred to as nylons. A common form of shorthand, which serves to identify aliphatic polyamides, involves the use of numbers that signify the number of carbon atoms in the respective monomers which were polymerized to form the polyamide. For Example, nylon-6 results from the polymerization of caprolactam and nylon-6,6 is formed by the polymerization of hexamethylenediamine and adipic acid.

In part, the instant invention pertains to the production of nylon-3 polymers and copolymers. It is known that nylon-3 can be prepared from various monomers. For example, U.S. Pat. No. 4,283,524 describes a process where nylon-3 is prepared from the ammonium salts of alpha,beta-unsaturated monocarboxylic acids. U.S. Pat. No. 2,691,643 teaches that nylon-3 can be prepared by the thermal condensation of beta-amino propionic acid. U.S. Pat. Nos. 3,629,203 and 3,499,879 relate to the preparation of nylon-3 by the condensation reaction of acrylonitrile. U.S. Pat. No. 2,749,331 teaches that nylon-3 can be prepared from acrylamide. However, nylon-3 polymers and copolymers produced by these processes are generally characterized by very low molecular weight.

An object of the instant invention is a catalytic process useful for preparation of polyamides.

A further object of the instant invention is a catalytic process useful for producing nylon-3 polymers and copolymers of increased molecular weight.

SUMMARY OF THE INVENTION

A catalytic process for producing polyamides, i.e. nylons, has been developed. This process entails contacting a polyamide forming system with a transition metal complex catalyst at a temperature sufficient to cause polymerization. The transition metal complex catalyst comprises at least one binucleating ligand attached to at least one transition metal containing nucleus. This catalytic process produces nylon-3 polymers and copolymers of increased molecular weight.

DETAILED DESCRIPTION OF THE INVENTION

The Polymer

The preferred polyamides obtained by the process of this invention are characterized as containing ethylene amido group in the polymer backbone. These ethylene amido groups are generally defined as having repeating units as follows:

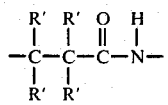

wherein each R' is hydrogen, an alkyl radical having from 1 to 4 carbon atoms or a halogen. These ethylene amido linkages comprise the basic structure of a nylon-3 type polyamide.

Polyamides wholly or partially comprised of other carbonamide structural units may also be obtained by the process of the instant invention. These carbonamide structural units will vary depending on the particular monomer or monomers used in the polymerization. For example, the carbonamide unit may comprise a nylon-6 type unit which has the following formula:

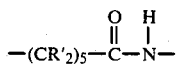

wherein R' is as previously defined. Other carbonamide units such as nylon-4 precursors, nylon-11 precursors, nylon-6,6 precursors, nylon-6,10 precursors, nylon-7 precursors, nylon-8 precursors and nylon-12 precursors may be contained in the polyamide of this invention. The properties of the resultant polyamide will depend on the type of monomer or monomers used and the ratio of the various monomers.

While this invention is directed principally to polyamides, it also includes within its ambit polyamides containing polymer chains formed from the above units together with other units which may be introduced into the chain, for example, by adding suitable copolymerizable monomers to the polymerization mixture.

The polyamides obtained by the process of this invention have a wide variety of applications. Generally, they may be used in any application calling for a nylon type polymer. For example, these polyamides can be used as fibers, plastics, films and molding resins.

Polyamide Forming Systems

Polyamide forming systems suitable for polymerization with the catalytic process of this invention include (1) alpha,beta-unsaturated carboxylic acids and ammonia, (2) ammonium salts of alpha,beta-unsaturated carboxylic acids, (3) amides of alpha,beta-unsaturated carboxylic acids, (4) alpha,beta-olefinically unsaturated nitriles and water, (5) omega-amino acids, (6) cyclic lactams and (7) combinations of any of these. The catalyst is also suitable for polymerizing alpha, omega-dinitriles with alpha,omega-diamines to form a polyamide and for polymerizing lactones with a polyamide precursor to form a polyamide ester.

The alpha,beta-unsaturated carboxylic acids suitable for polymerization when contacted with ammonia are of the structure

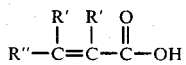

where R' is hydrogen, a lower alkyl group having from 1 to 4 carbon atoms or a halogen and R" is hydrogen or an alkyl group having from 1 to 10 carbon atoms. Such compounds include propenoic acid and crotonic acid, with propenoic, i.e. acrylic acid, preferred.

The ammonium salts of alpha,beta-unsaturated carboxylic acids suitable for this invention are of the formula:

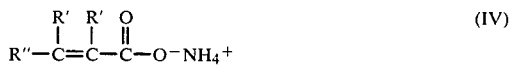
$$R''-C=C-C-O^-NH_4^+ \quad \text{(IV)}$$
(with R', R' and O shown above the C's)

where R' and R'' are as defined in the preceding paragraph. The ammonium salts of this invention typically result from the reaction of an alpha-beta-unsaturated carboxylic acid and ammonia. Preferred ammonium salts contain between 3 and 7 carbon atoms. Most preferred are ammonium acrylate and ammonium methacrylate.

The amides of alpha,beta-unsaturated carboxylic acids suitable for polymerization are of the following formula:

(V)

where R' and R'' are as previously defined. Preferred amides contain between 3 and 7 carbon atoms. Most preferred amides are acrylamide and methacrylamide.

The unsaturated nitriles suitable for polymerization when contacted with water are the alpha,beta-olefinically unsaturated mononitriles having the structure:

(VI)

wherein R' is hydrogen, a lower alkyl group having from 1 to 4 carbon atoms or a halogen. Such compounds include acrylonitrile, alpha-chloroacrylonitrile, alpha-fluoroacrylonitrile, methacrylonitrile, ethacrylonitrile and the like. The most preferred monounsaturated nitriles are acrylonitrile and methacrylonitrile.

The amino acids most useful in the present invention are the omega-amino acids having the structure

(VII)

where R' is as previously defined and R''' is a divalent alkyl radical having between 1 and 10 carbon atoms. Such compounds include beta-alanine, alpha-methyl-beta-alanine and epsilonaminocaproic acid.

The cyclic lactams most useful in the present invention contain between 3 and 8 carbon atoms. Preferred lactams are caprolactam, pyrrolidone and other commercially available lactams. Other lactams of use in this invention may be synthesized by one skilled in the art.

The diamines most useful in the present invention are alpha, omega-diamines of the formula:

$$R^V HN-R^{IV}-NHR^V \quad \text{(VIII)}$$

where $R^{IV}$ is a divalent organic radical and each $R^V$ is independently hydrogen or a univalent organic radical. $R^{IV}$ may be an aliphatic, alicyclic or an aromatic radical or a substituted derivative thereof. $R^V$ may be a hydrogen or an aliphatic, an alicyclic or an aromatic radical or a substituted derivative thereof. If substituted, the substituents are inert under the reaction conditions. Preferably $R^{IV}$ is a $C_2$-$C_{20}$ aliphatic radical, a $C_5$-$C_7$ alicyclic radical, an arlene radical or an inertly substituted derivative of any one of these. Preferably $R^V$ is hydrogen, a $C_1$-$C_{20}$ aliphatic radical, a $C_5$-$C_7$ alicyclic radical, a phenyl radical or an inertly substituted derivative of any one of these. Preferred diamines are aliphatic or aromatic diamines which contain from 4 through 12 carbon atoms such as tetramethylenediamine, hexamethylenediamine, p-diaminodicyclohexylmethane, 4,4' diaminodicyclohexylether, 4,4' diaminodicyclohexylsulfide, octamethylenediamine, decamethylenediamine, dodecamethylenediamine and the like, i.e. wherein $R^{IV}$ is an alkylene or arylene divalent radical of 4 to 12 carbon atoms and $R^V$ is hydrogen.

The dinitriles most useful in the present invention are alpha, omega-dinitriles of the formula:

$$NC-R^{IV}-CN \quad \text{(IX)}$$

where $R^{IV}$ is as defined in the preceding paragraph. Preferred dinitriles are aliphatic or aromatic dinitriles which contain from 4 through 12 carbon atoms, such as, glutaronitrile, succinonitrile, adiponitrile, suberonitrile, sebaconitrile, 1,10-decane dinitrile, methyl glutaronitrile terephthalonitrile and the like; i.e. wherein $R^{IV}$ is an alkylene or arylene divalent radical of 2 to 10 carbon atoms. The diamines and dinitriles preferred for this invention are commercially available.

The catalysts and process of the instant invention is also useful for preparing polyamide esters by the polymerization of lactones with a suitable polyamide precursor. Lactones of use in the present invention to form a polyamide ester contain between 3 and 8 carbon atoms. Preferred lactones are propiolactone, caprolactone and lactones commercially available. Other lactones may be synthesized by one skilled in the art. Suitable polyamide precursors include, the ammonium salts of an alpha,-beta-unsaturated carboxylic acid, omega-amino acids, alpha,beta-unsaturated mononitriles and the like. These polyamide precursors are as previously described. Preferred polyamide precursors for copolymerization with a lactone to form a polyamide ester are ammonium acrylate, acrylonitrile, beta-alanine and the like.

The Catalyst

The catalysts of the instant invention are transition metal complexes. These transition metal complex catalysts contain at least one ligand. As here used, a ligand is a molecule, ion, or atom that is attached to the central atom or molecule of a coordination compound. A ligand which is capable of attaching to two central atoms or molecules is a binucleating ligand. A ligand which is attached to two central atoms or molecules is a binucleated ligand. A binucleating ligand is further defined to be a ligand which has the ability to bind in a multidentate fashion to two metal containing centers. The catalysts of the instant invention preferably utilize a binucleating ligand attached to two nuclei. However, where the nucleus, i.e. the central atom or molecule, is large, a single nucleus can satisfy the bonding requirements of the normally binucleating ligand.

The transition metal complex consists of a binucleating ligand attached to at least one nucleus, which contains at least one transition metal. Preferably the binucleating ligand simultaneously attaches to two nuclei. Preferably both nuclei contain at least one transition metal. It is not mandatory that both nuclei contain the same elemental components. Optionally the second nucleus may contain at least one metal from Group I, Group IIA and Group IIIA of the Periodic Tables. The Periodic Table referred to herein is that appearing in the *Handbook of Chemistry and Physics*, 61st ed., Chemical Rubber Co. (1980). As here used and through the specification and claims, when a nucleus is said to "contain" an element or compound, then that nucleus is either that element or compound per se or the nucleus is a larger composition which includes that element or compound.

The transition metal complex of at least one binucleating ligand is a coordination compound. The bonding in a coordination compound is neither covalent nor electrostatic but is usually considered to be an intermediate between the two types. For purposes of this specification, a dotted line will be used in formulas and structures of transition metal complexes in order to show the locations of this coordination compound type bonding.

Preferred transition metal complexes are of the following general formulae:

(a) 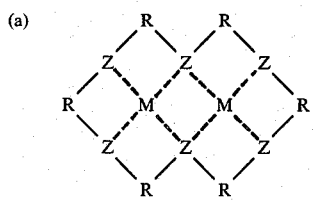 (X)

(b) 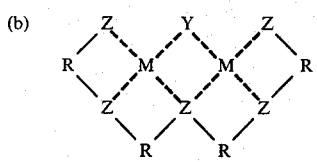 (XI)

(c) 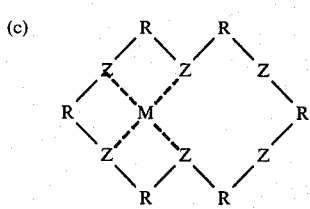 (XII)

and (d) 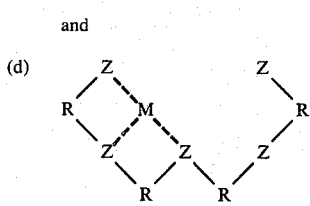 (XIII)

Each M denotes a nucleus of the ligand. Each M contains at least one element of Groups IA, IIA, IIIA, IB, IIB, IIIB, IVB, VB, VIB, VIIB and VIII of the Periodic Table with the proviso that at least one M contains an element of Groups IB, IIB, IIIB, IVB, VB, VIB, VIIB, and VIII i.e. a transition metal.

Where M contains a transition metal, each M may be:

(1) at least one transition metal. Preferred transition metals are cobalt and molybdenum.

(2) a coordination compound containing at least one transition metal. A coordination compound is formed by the union of a metal ion with a nonmetallic ion or molecule called a ligand. A coordination compound may consist of one ligand or several ligands attached to a central atom or molecule called the nucleus. The transition metal is contained in the nucleus of the coordination compound. The ligands may be monodentate or multidentate. Suitable ligands include but are not limited to any alkoxide, azide, halide, sulfide, carboxylate, nitrate, sulfate, phosphate, perchlorate, amine, ether, thioether, phosphine, arsine, and oxime. Preferred coordination compounds are alkoxides, carboxylates, halides, nitrates and sulfates.

Where M contains an element of Group IA, Group IIA and Group IIIA, preferred elements are hydrogen, beryllium, magnesium and calcium.

Typically each M contains at least one transition metal. However, several embodiments of this invention include where only one M contains a transition metal and the other M contains a non-transition metal, specifically one M is one of cobalt and molybdenum and the other M is magnesium or hydrogen.

A relationship has been discovered between the valence states of the nuclei and the effectiveness of the catalyst. Generally the higher the valence of each nucleus the more effective the catalyst. For the catalyst of this invention it is preferred that the valence of at least one nucleus be greater than or equal to +2. It is more preferred that the valence of at least one nucleus be greater than +2.

Each R is independently an aliphatic, a cycloaliphatic, an aromatic radical or fraction thereof or an inertly substituted derivative of any one of these. Preferably each R is independently a $C_1$ to $C_8$ aliphatic radical, a $C_5$ to $C_7$ cycloaliphatic radical, an aryl radical or an inertly substituted derivative of any one of these.

Y is any coordinating anion. Suitable coordinating anions are at least one of any alkoxide, halide, azide, hydroxide, cyanide, isocyanide, pyrazolate, amide, imidazolate and hydrazide. Preferred coordinating anions are any alkoxide, halide, azide, hydroxide. Most preferred coordinating anions are ethoxy and chloride.

Each Z is at least one of oxygen, nitrogen, sulfur or phosphorus.

Each R and Z in Formulas' X, XI, XII and XIII represent portions of a binucleating ligand. Examples of binucleating ligands which are represented in their binucleated state in Formulas X, XI, XII and XIII are:

(a) 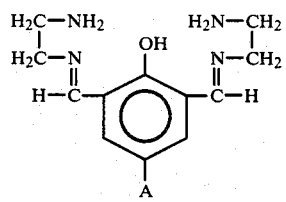 (XIV)

(b) 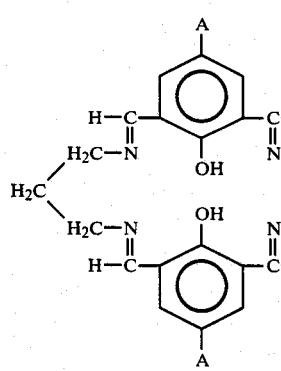 (XV)

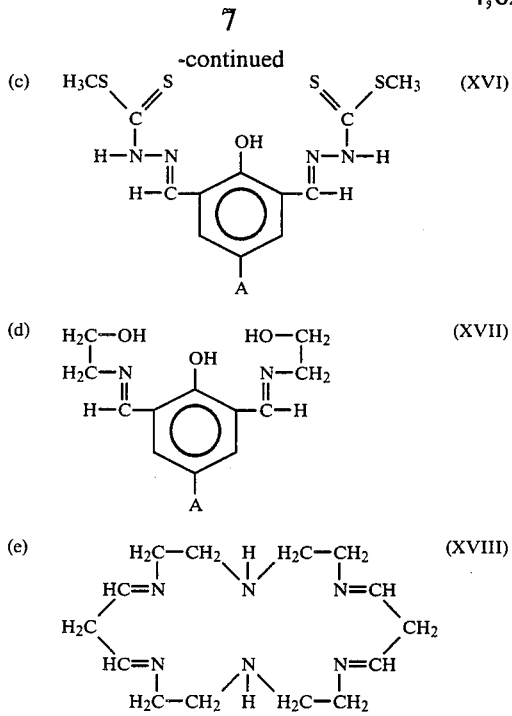

where A is an alkyl radical. Preferably A is $C_1$ to $C_{10}$ alkyl radical. More preferably A is a methyl radical or a tert-butyl group, i.e. $C(CH_3)_3$.

A preferred binucleating ligand is 4-tert-butyl-[bis-2,6-N-(S-heptyldithiocarbamate)formimidoyl]-phenol which has the following structure:

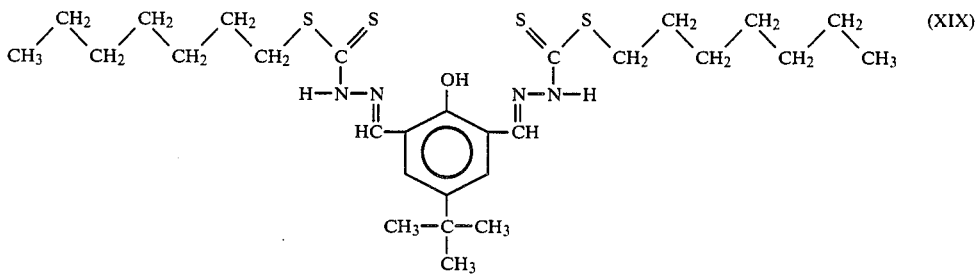

when this preferred binucleating ligand is reacted with Co(II) acetate and ethanol, a mixed valence compound Co(II)Co(III)(OEt)(OAc) is formed:

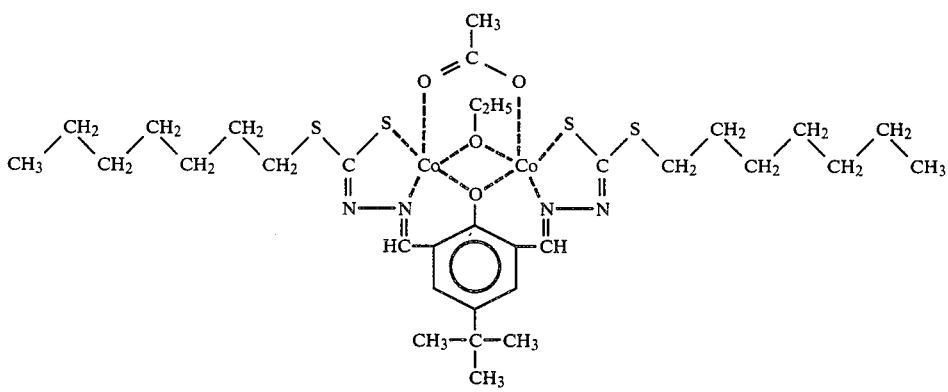

Similarly, the preferred binucleating ligand of Formula XIX can be reacted with molybdenum acetate, $Mo_2(CH_3COO)_4$, and ethanol to form a mononuclear complex.

Typically the ligands shown in Formulas XIV, XV, XVI, XVII, XVIII and XIX and the resulting mononuclear and binuclear transition metal complexes are prepared by sequential displacement reactions in solution. The reactions and techniques required to make these compounds are well known to those skilled in the art of inorganic and organic synthesis.

The Cocatalyst

In one embodiment of this invention, the catalyst is employed with an optional cocatalyst. The cocatalyst is an organometallic compound containing at least one element of Group IA, Group IIA and Group IIIA. An organometallic compound is comprised of a metal attached directly to a carbon atom. The elements of Group IA, Group IIA and Group IIIA of the Periodic Table suitable for use in the cocatalyst are lithium, sodium, potassium, cesium, beryllium, magnesium, calcium, strontium, boron, aluminum, gallium and indium. Preferred cocatalysts are di-sec-butylmagnesium, n-butylmagnesium chloride, aluminum triethyl and compounds of the formula:

$$(R^{VI})_n AlX_{(3-n)} \tag{XXI}$$

where $R^{VI}$ is at least one of an aliphatic, cycloaliphatic or aromatic radical or an inertly substituted derivative of any one of these, X is a halide and n is less than or equal to 3, but greater than 0.

Preferably $R^{VI}$ is at least one of a $C_1$ to $C_8$ aliphatic radical, a $C_5$ to $C_7$ cycloaliphatic radical or a phenyl radical. More preferably $R^{VI}$ is at least one of an alkyl, aryl, arylalkyl, alkenyl or arylalkenyl radical or an inertly substituted derivative of any one of these. Most preferably $R^{VI}$ is at least one of an ethyl, isopropyl, sec-butyl, isobutyl, cyclohexyl, phenyl, benzyl, 1-octenyl and 1-phenyl-1-heptenyl radical.

Preferably X is at least one of chlorine, bromine and iodine. More preferably X is chlorine.

The most preferred cocatalysts include ethylaluminum dichloride, ethylaluminum sesquichloride and diethylaluminum chloride. Ethylaluminum dichloride is the most preferred cocatalyst.

Organometallic compounds are frequent cocatalysts in catalyst systems and their preparation is known to those skilled in the art. These catalysts are readily synthesized and many are commercially available.

Typically the transition metal complex catalyst and the organometallic compound cocatalyst are mixed in an inert diluent. The mole ratio of the organometallic compound cocatalyst to the transition metal complex catalyst is between approximately 1:1 and 300:1, preferably between approximately 3:1 and 50:1.

The Process

The polymerization of the monomers suitable for polyamide formation may be conducted under a broad range of process conditions which are generally known in the prior art. In the preferred practice of the invention, monomer or monomers are maintained at a temperature above their melting points but below the decomposition temperature of the products. It is generally preferred to conduct the process at a temperature between 100° and 300° C., and conducting the process between 135° and 200° C. is most preferred.

The temperature and amount of time required for polymerizaton are interrelated. At low temperatures it will take longer for a polymer to form than at high temperatures. In general, the reaction is conducted in less than 48 hours, with times ranging from 2 to 20 hours normally being adequate to produce the polyamide.

Although this polymerization can take place in an open container in contact with the atmosphere, it is preferred to carry out the polymerization in the absence of oxygen. This can be achieved by blanketing the reaction mixture with either an inert gas such as nitrogen or with a gaseous reactant necessary for polymerization, e.g. gaseous ammonia when polymerizing an alpha,beta-unsaturated carboxylic acid or steam when polymerizing an alpha,beta-unsaturated nitrile.

This reaction can proceed at atmospheric, superatmospheric or subatmospheric pressure. Normally, sufficient pressure is required to maintain the volatile ingredients in the liquid state under the polymerization conditions and to control the concentration of gaseous ingredients. Thus, the polymerization normally takes place under superatmospheric pressure. After polymerization has proceeded for a suitable time, the pressure can be lowered to pull off water and other volatiles. In processes employing the binuclear metal complex catalyst of this invention it has been discovered that pressure has little effect on the binuclear metal complex catalyst process for pressures between 1 and 100 atmospheres. Preferred pressure is atmospheric or slightly above.

Another important factor in the conduct of the polymerization is the extent to which the reactants are able to physically contact each other so that the desired reaction can occur. Various aromatic, aliphatic or halogenated hydrocarbon solvents and liquid dispersions are helpful in improving the contacting. Many of the binuclear metal complex catalysts and optional organometallic complex cocatalysts are soluble in such solvents.

The catalyst dissolved in a solvent leads to the greatest efficiency of use of the catalytic metal species. It has also been found that ammonia and/or water can be added to improve the conversion of the monomers to high molecular weight polymer.

A catalytic amount sufficient to promote some polymer formation is required. Typically the mole ratio of monomer to catalyst is between 50:1 and $1 \times 10^6:1$.

In one embodiment, the transition metal complex and organometallic compound are first dissolved in a small quantity of solvent. This solution is then added to a larger quantity of an inert diluent to form a heterogenous dispersion. An inert diluent is a diluting agent which does not react with the catalyst or the cocatalyst, and in which the catalyst is insoluble. The volume ratio of the solvent solution to the inert diluent is between 5:1 and 50:1. Suitable solvents are aromatic hydrocarbons, or inertly substituted derivatives thereof, or a halogenated aliphatic hydrocarbon. Suitable inert diluents are aliphatic and alicyclic hydrocarbons. Preferred inert diluents are n-hexane, n-heptane, 2,2,4-trimethylpentane, and cyclohexane.

This polymerization process can proceed by any of the generally known modes of polymerization including bulk, slurry, suspension or solution polymerization by batch, continuous or intermittant addition of the monomers and other components. The polyamides produced have a wide variety of applications. Generally, they may be used in any application calling for a nylon type polymer. For example, these polyamides can be used as fibers, plastics, films and molding resins.

The catalyst of this invention has several advantages for use in polyamide formation and specifically nylon-3 formation. These advantages include high yields of polyamides; very low levels of catalysts being required; structural control of the polymer molecule is achieved due to steric and electronic effects of the catalyst; increased molecular weight.

SPECIFIC EMBODIMENTS

Preferred catalysts of this invention include metal complexes of the binucleating ligand, 4-tert-butyl-[bis-2,6-N-(S-heptyldithiocarbamate)-formimidoyl]-phenol. The following examples and comparisons describe the preparation and use of these catalysts and are provided in order to better illustrate the instant invention.

EXAMPLE I

Preparation of the Bionucleating Ligand 50 g sodium hydroxide were dissolved in approximately 1.2 liters of water, and 150 g of 4-tert-butylphenol were added to this solution. The mixture was stirred and gently heated until the phenol dissolved. The solution was then cooled to ambient temperature. Aqueous formaldehyde (175 ml, 37 percent) was added, and the solution was stirred for four to six days at ambient temperature. Concentrated hydrochloric acid (110 ml) was added, upon which a two-phase system formed. A yellow, oily organic phase was isolated and washed with three 500 ml portions of water. Chloroform (700 ml) and 500 ml of water were added to this organic oil and the mixture was stirred. The organic phase was isolated and dried over 100 g of anhydrous magnesium sulphate. Evaporation and cooling of the chloroform solution yielded a mixture of white crystals and oil. The addition of 50–100 ml of chloroform and filtration yielded a white crystalline product, 4-tert-butyl-2,6-di(hydroxymethyl) phenol.

The 4-tert-butyl-2,6-di(hydroxymethyl) phenol (94.6 g) was added to 300 ml of water containing 23 g of sodium hydroxide. Toluene sulfonylchloride (90 g) and 100 ml of benzene were also added. The system was stirred vigorously for two days, filtered, and the white solid product was washed with three 100 ml aliquots of benzene. A 50–70 percent yield of the tosylated diol was obtained.

The tosylated diol (102 g) was dissolved with heating and stirring in 400 ml of glacial acetic acid. The solution was heated nearly to boiling and 86.3 g of sodium dichromate monohydrate were added very slowly. Upon cooling, the dark green solution yielded a powdery solid. The product was separated from the chromous salt solution and washed with water and 3:1 water:ethanol. The product was then dissolved in boiling ethanol to form an approximately 20 wt/vol percent solution. About 10 vol percent water was added and the solution was cooled while stirring. The pale green crystals of the tosylated diformylphenol which form were recovered by filtration and washed with 1:1 ethanol:water.

The tosylated diformyl compound (30 g) was then dissolved in 35 ml of concentrated sulfuric acid and stirred for at least 30 minutes. The solution was then poured slowly into a 800 ml beaker containing 600 ml of crushed ice. The pink-brown solid which formed was stirred in the ice-water mixture for at least two hours, then recovered by filtration, washed with water, and dried on the filter. The solid was extracted with mixed hexanes, using approximately one liter of hexane per 10 g of solid, until only a purple-red tar remained. The hexane solution was then evaporated to yield the yellow solid, 4-tert-butyl-6-formylsalicylaldehyde. The overall yield was generally of the order of 10–20 percent.

A solution of 34.2 g of potassium hydroxide in 190 ml of absolute ethanol and 20 ml of water was prepared. To this solution was added 34.8 g of 85 percent hydrazine hydrate. The solution was cooled in a sodium chloride-ice-water bath and stirred vigorously while adding dropwise over a two-hour period a solution of 36 ml of carbon disulfide in 39 ml of absolute ethanol, maintaining the reaction temperature at less than 3° C. Filtration of the reaction mixture yielded a white solid, potassium dithiocarbazate.

A solution of 26 g of potassium dithiocarbazate in 50 ml of 40 percent aqueous ethanol was prepared and 44 g of 1-iodoheptane were added. The mixture was stirred at ambient temperature for two days. The reaction flask was wrapped in aluminum foil to prevent the photodecomposition of the heptyliodide. The solution was then cooled in an ice bath and quickly filtered to recover the white solid, S-heptyldithiocarbazate. A yellow oil by-product was then removed by washing the white solid with ligroine. The product was then recrystallized from boiling hexane.

Solutions consisting of 8 g of the freshly-recrystallized S-heptyl-dithiocarbazate in 500 ml of 1:1 ethanol:water and 4 g of 4-tert-butyl-6-formylsalicylaldehyde in 200 ml of ethanol were prepared. The two solutions were heated to boiling and quickly filtered. The two solutions were again heated to boiling, and the dialdehyde solution was added, with rapid agitation, to the S-heptyldithiocarbazate solution. A yellow precipitate formed almost immediately. The reaction mixture was allowed to boil for two minutes, then was cooled while stirring, and the yellow solid was isolated by filtration. This product was washed with three 300 ml portions of 1:1 ethanol:water, followed by two 200 ml portions of 95 percent ethanol. The structure of this yellow crystalline solid was identified as:

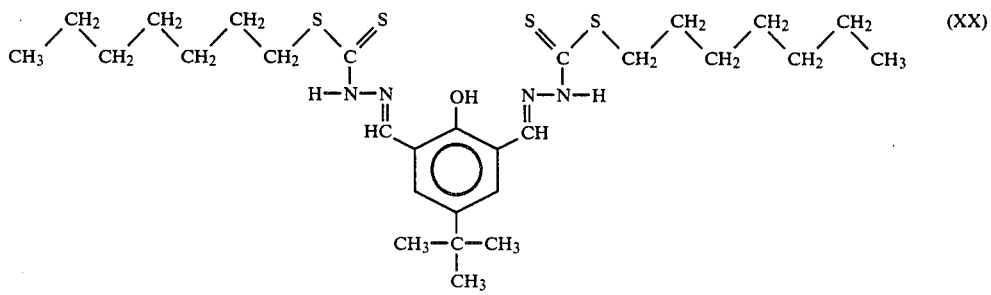

The above structure corresponds to the binucleating ligand, 4-tert-butyl-[bis-2,6-N-(S-heptyldithiocarbamate)-formimidoyl]-phenol, henceforth referred to simply as H₃BNL for the binucleating ligand in its protic form and simply as BNL for the binucleated ligand in a metal complex.

EXAMPLES II–VI

Preparation of Metal Complexes of the above Binucleating Ligand

The preparation of several binuclear metal complex catalysts from the binucleating ligand are described. In these examples (Me) is a methyl radical, (Et) is an ethyl radical and (Ac) is an acetyl radical. The structure of each of the catalysts produced was determined by Infrared spectroscopy, NMR spectroscopy, ESR spectroscopy and elemental analysis. The formula weight of each catalyst was determined by elemental analysis, mass spectrometry and magnetic susceptibility.

EXAMPLE II

Co₂(BNL)(OEt)(OAc)

548 mg of Co(acetate)$_2$·4H$_2$O (2.2 mmoles) and 583 mg of H$_3$BNL (1.0 mmoles) were combined in a flask with 18 ml of ethanol and 2 ml of toluene. The solution was stirred for two days after which time the solvent was removed. The dark redbrown solid was washed with methanol and methanol-water followed by drying at 100° C. under vacuum. This method produced a yield of 75 percent of the above catalyst. The formula weight of this catalyst was determined to be 801.91 g/mole.

EXAMPLE III

Co$_2$(BNL)(OEt)(OAc).toluene 520 mg of Co(acetate)$_2$.4H$_2$O (2.1 mmoles) was dissolved in 20 ml of ethanol. To this solution was added 10 ml of 2,2-dimethyoxypropane (Aldrich). The solution turned from red to green in color. (This addition of a drying agent is optional.) 583 mg of H$_3$BNL (1.0 mmoles) was dissolved in 10 mL of THF and combined with the Co solution. The solution was allowed to stir for 24 hours, followed by rotovapping to dryness. The solid residue was dissolved in 30 ml of 10:1 toluene-(2,2-dimethyoxypropane) or pure toluene, filtered and rotovapped to dryness. The residue was dissolved in 30 ml of toluene, filtered and upon slow evaporation produced a deep black crystalline solid. A yield of 60 percent for the above catalyst was determined. The formula weight for this catalyst was determined to be 896.06 g/mole.

EXAMPLE IV

Co$_2$(BNL)(OEt)(HOAc)

510 mg of Co(acetate)$_2$.4H$_2$O (2.05 mmoles) and 583 mg of H$_3$BNL were dissolved in 20 ml of degassed ethanol in the inert atmosphere box. After stirring for one hour the solution became a clear red, and the stirring was continued for two days. The ethanol was then removed by evaporation under vacuum, the residue dissolved in toluene, filtered and the toluene removed by evaporation under vacuum, producing a dark red crystalline solid. This method produced a 75 percent yield of the above catalyst, which was determined to have a formula weight of 802.92 g/mole.

EXAMPLE V

Co$_2$(BNL)(OMe)(OAc)

372 mg of anhydrous Co(acetate)$_2$ (2.1 mmoles) and 583 mg of H$_3$BNL (1.0 mmoles) were placed in 25 ml of absolute methanol and 1 ml of 2,2-dimethoxypropane. The system was stirred for two days. The precipitate was filtered and washed with methanol. The product did have some solubility in the methanol, resulting in a low product yield. This method produces a 40 percent yield of this catalyst which was determined to have a formula weight of 787.88 g/mole.

EXAMPLE VI

MoHBNL

To 40 ml of EtOH were added 471 mg (1.1 mmoles) of Mo$_2$(acetate)$_4$ and 583 mg (1.0 mmoles) of H$_3$BNL. The system was stirred under an atmosphere of ultrapure (>99.9 percent) argon. The solution was heated to ~50° C. and stirred for 5 more days, periodically adding ethanol to keep the volume close to 40 ml (solvent evaporation occured due to the continuous argon flushing of the system). The solution was a dark brown and was evaporated to dryness via rotoevaporation with mild heating. The residue was extracted with toluene, with only a small fraction of the total solids being dissolved. The toluene was filtered and rotoevaporated to yield a glassy black solid (310 mg) which was dried under vacuum at 80° C. for 18 hours. The formula weight of the resulting complex was 676.91 g/mole.

EXAMPLE VII

(VO)$_2$(BNL)(OEt)

389 mg of vanadyl acetate (2.1 moles) was added to 583 mg of H$_3$BNL (1.0 moles) in 25 ml of absolute ethanol. The mixture was stirred at ambient temperatures for approximately two weeks. The reaction mixture was filtered and the solid was washed while on the filter with ethanol and toluene. Unreacted vanadyl acetate remained on the filter. The filtrate and washings were combined and the solvent was removed on a rotary evaporator. An olive-green solid was obtained in a 60 to 90 percent yield and had a formula weight of 758.88 g/mole.

EXAMPLE VII

Production of a Mixed Co and V Complex 246 mg of Co$_2$(BNL)(OEt)(OAc).toluene and 180 mg of (VO)$_2$(BNL)(OEt) were dissolved with stirring in 40 ml of toluene. The solution was blanketed with argon at ambient temperature while stirred for two weeks. After this time, significant amounts (greater than 20 percent) of both Co(II)(VO)(BNL)(OEt) and Co(III)(VO)(BNL)(OEt)(OAc) had formed and were confirmed by EPR spectroscopy. The solution was roto evaporated to dryness and an oily solid was obtained. This solid was then dried at 60° C. under vacuum for 24 hours to yield a dark glassy solid.

EXAMPLE IX

Polymerization

Process steps, Conditions, Apparatus and Polymer Recovery

Several experiments were conducted with various catalysts and monomers. In each experiment the catalyst and monomer were placed in a 50 ml glass ampoule. The container was purged with nitrogen and flame sealed. The sealed ampoules containing monomer and catalyst were placed in an air oven at 175° C. for 16 hours. The room temperature ampoules were cooled to dry ice temperatures, scored and opened with a hot glass rod. Fifteen mls of 95 percent formic acid were charged to each vial and the vials were aggitated in an ultra-sonic bath at 50° C. until solution was complete, usually less than eight hours. The resulting solutions were filtered of any insoluble salts and coagulated in 200–300 ml of acetone. The precipitated polymers were filtered off on glass frit funnels, dryed in vacuum at 50° C. for 24 hours, weighted and bottled prior to analysis.

The dryed polymers were subject to three analyses (1) intrinsic viscosity (2) x-ray diffraction and (3) NMR and IR spectroscopy. The intrinsic viscosity was conducted in 90 percent formic acid at 25° C. in a dilution Ubelhode viscometer. The x-ray diffraction was done using powder diagram techniques. The degree of crystallinity can be determined by this method.

The results of several polymerizations are shown in Table I. The intrinsic viscosity is related to molecular weight through the expression (intrinsic viscosity)=K(MW)$^a$, where "K" and "a" are constant for a specified temperature, polymer and solvent. Even though the constants "K" and "a" are unknown for the nylon-3 polymers of these experiments, an increase in molecular weight can be observed through an increase in intrinsic viscosity. In Experiments 1–5, the catalysts of the instant invention produced polyamides with a higher molecular weight than in Experiments A and B where no catalysts were employed.

TABLE I

| Experiment No. | Catalyst | gm Catalyst | Monomer | gm Monomer | Percent Conversion | Percent Crystallinity | Intrinsic Viscosity |
|---|---|---|---|---|---|---|---|
| A | No Catalyst | | Ammonium Acrylate | 5.00 | 66.8 | 34.9 | 0.15 |
| B | No Catalyst | | Ammonium Methacrylate | 5.00 | 47.0 | 38.2 | .08 |
| 1 | Co(II)Co(III)(BNL)(OEt)(OAc) | .01 | Ammonium Methacrylate | 1.00 | 10.8 | — | 0.14 |
| 2 | Co(II)Co(III)(BNL)(OEt)(OAc) | .009 | Ammonium Acrylate | 1.00 | 82.8 | 20.65 | 0.37 |
| 3 | Mo(HBNL) | .01 | Ammonium Acrylate | 1.00 | 97.7 | 31.9 | 0.26 |
| 4 | Co(II)Co(III)(BNL)(OEt)(OAc) | .01 | Beta-Alanine | 1.00 | 95.2 | 36.3 | 0.10 |
| 5 | Mo(HBNL) | .01 | Beta-Alanine | 1.00 | 92.7 | 31.9 | 0.10 |

EXAMPLE X

Polymerization of Acrylamide

Approximately 0.04 grams of the catalysts produced in Example VIII, a mixture of Co$_2$(BNL)(OEt)(OAc)-toluene, Co(II)(VO)(BNL)(OEt) and Co(III)(VO)(BNL)(OEt)(OAc) were used to polymerize 4 gm of acrylamide in the process described in Example IX. NMR, IR and Differential Scanning Calorimetry confirmed polyamide, i.e. nylon-3 formation.

Although only a few embodiments of the present invention have been described above, it should be appreciated that many additions and modifications can be made without departing from the spirit and scope of the invention. These and all other modifications are intended to be included within the scope of the present invention, which is to be limited only by the following claims.

The invention claimed is:

1. A process for producing a nylon polyamide comprising contacting, at a temperature sufficient to cause polymerization, a polyamide forming system with a transition metal complex catalyst; the catalyst comprising at least one binucleating ligand attached to at least one transition metal containing nucleus.

2. The process of claim 1, where the catalyst is represented by one of the following formulae:

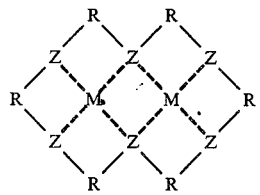 (a)

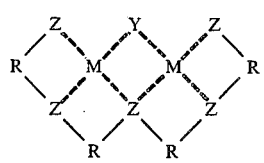 (b)

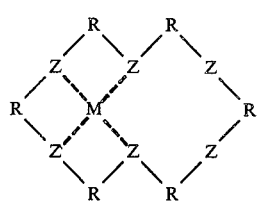 (c)

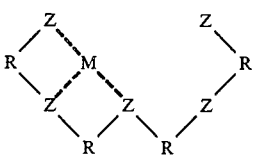 (d)

where each M is a nucleus and each M contains at least one element of Groups IA, IIA, IIIA, IB, IIB, IIIB, IVB, VB, VIB, VIIB or VIII of the Periodic Table with the proviso that at least one M contains an element of Groups IB, IIB, IIIB, IVB, VB, VIB, VIIB or VIII;

each R is an aliphatic, a cycloaliphatic, an aromatic radical or an inertly substituted derivative of any one of these;

each Z is at least one of oxygen, nitrogen, sulfur or phosphorus; and

Y is a coordinating anion.

3. The process of claim 2 where the valence of at least one M of the catalyst is greater than or equal to +2.

4. The process of claim 2 where the valence of at least one M of the catalyst is greater than +2.

5. The process of claim 2 where each M which independently contains an element of Groups IA, IIA, IIIA, IB, IIB, IIIB, IVB, VB, VIB, VIIB and VIII is independently one of:

(a) at least one element of Groups IA, IIA, IIIA, IB, IIB, IIIB, IVB, VB, VIB, VIIB and VIII, (b) a coordination compound containing at least one element of Groups IA, IIA, IIIA, IB, IIB, IIIB, IVB, VB, VIB, VIIB and VIII in its nucleus.

6. The process of claim 5, where each M of the catalyst is at least one of cobalt or molybdenum.

7. The process of claim 5 where M is a coordination compound, M is comprised of at least one ligand of any alkoxide, azide, halide, sulfide, carboxylate, nitrate, sulfate, phosphate, amine, ether, thioether, phosphine, arsine, and oxime and attached to a nucleus containing at least one element of Groups IA, IIA, IIIA, IB, IIB, IIIB, IVB, VB, VIB, VIIB and VIII.

8. The process of claim 2, where each R is independently a C$_1$–C$_8$ aliphatic radical, a C$_3$–C$_6$ cycloaliphatic radical, a phenyl radical or an inertly substituted derivative of any one of said radicals.

9. The process of claim 2, where Y is at least one of an alkoxide, halide, azide, hydroxide, cyanide, isocyanide, pyrazolate, amide, imidazolate or hydrazide.

10. The process of claim 9 where Y is at least one of an alkoxide, halide, azide or hydroxide.

11. The process of claim 10 where Y is ethoxy or chlorine.

12. The process of claim 1, where the catalyst is a complex of one of the following binucleating ligands:

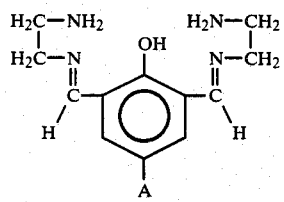 (a)

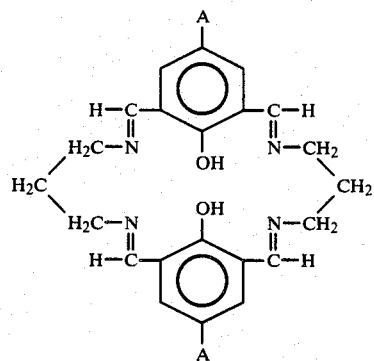 (b)

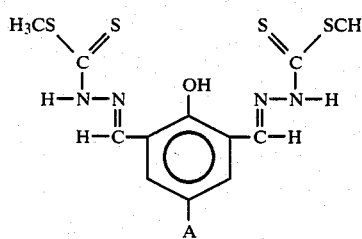 (c)

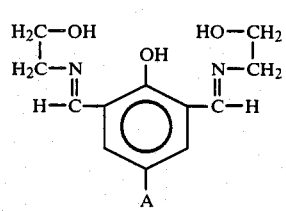 (d)

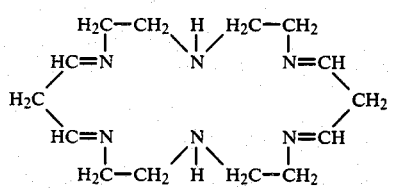 (e)

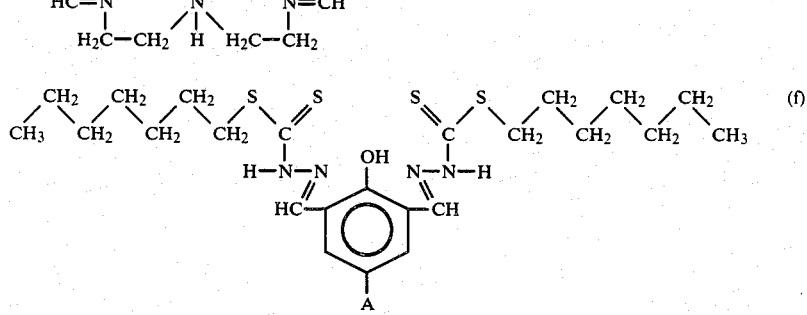 (f)

where A is an alkyl radical.

13. The process of claim 12, where A in the binucleating ligands is an alkyl radical of 1 to 10 carbon atoms.

14. The process of claim 13, where A is a methyl radical or a tert-butyl radical.

15. The process of claim 12, where the catalyst contains the binucleating ligand is 4-tert-butyl-[bis-2,6-N-(S-heptyldithiocarbamate)-formimidoyl]-phenol.

16. The process of claim 15, where the catalyst has a single nucleus and the catalyst is a complex of molybdenum and 4-tert-butyl-[bis-2,6-N-(S-heptyldithiocarbamate)-formimidoyl]-phenol.

17. The process of claim 15, where the catalyst has two nuclei, the catalyst is a complex of cobalt and 4-tert-butyl-[bis-2,6-N-(S-heptyldithiocarbamate)-formimidoyl]-phenol and the catalyst has the following structure:

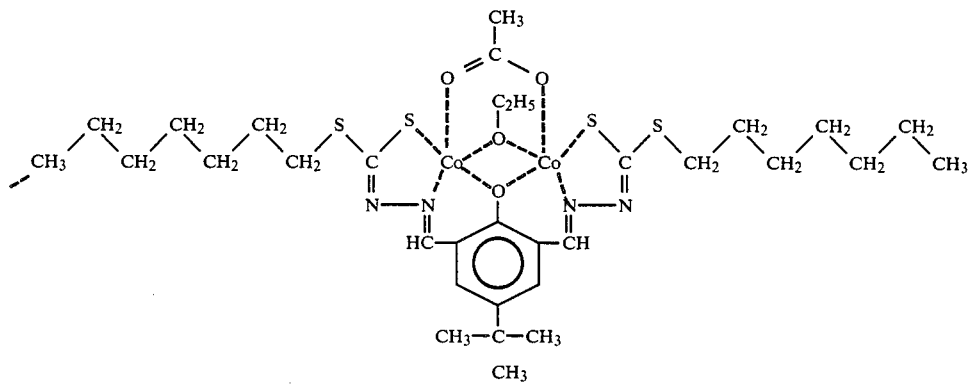

(XVIII)

18. The process of claim 1, where the transition metal complex catalyst additionally comprises a cocatalyst comprised of an organometallic compound containing at least one element of Group IA, Group IIA or Group IIIA of the Periodic Table of Elements.

19. The process of claim 18, where the cocatalyst is at least one of:
  (a) di-sec-butylmagnesium;
  (b) n-butylmagnesium chloride;
  (c) aluminum triethyl and
  (d) compounds of the formula:

$$(R^{VI})_n AlX_{(3-n)}$$

where
$R^{VI}$ is at least one of an aliphatic, cycloaliphatic and aromatic radical of 1 to 8 carbon atoms,
X is a halide and
n is less than or equal to 3 but greater than 0.

20. The process of claim 19, where $R^{VI}$, in the cocatalyst of the formula $(R^{VI})_n AlX_{(3-n)}$, is at least one of an alkyl, aryl, arylalkyl, alkenyl, and arylalkenyl radical.

21. The process of claim 20, where $R^{VI}$ is at least one of an ethyl, isopropyl, sec-butyl, isobutyl, cyclohexyl, phenyl, benzyl, 1-octenyl and 1-phenyl-1-heptenyl radical.

22. The process of claim 19, where X, in the cocatalyst of the formula $(R^{VI})_n AlX_{(3-n)}$, is at least one of chlorine bromine and iodine.

23. The process of claim 22, where X is chlorine.

24. The process of claim 19, where the cocatalyst of the formula $(R^{VI})_n AlX_{(3-n)}$ is at least one of ethylaluminum dichloride, ethylaluminum sesquichloride and diethylaluminum chloride.

25. The process of claim 18 where the mole ratio of the organometallic compound cocatalyst to the transition metal complex catalyst is between approximately 1:1 and 300:1.

26. The process of claim 25 where the ratio of the organometallic compound cocatalyst to the transition metal complex catalyst is between approximately 3:1 and 50:1.

27. The process of claim 4, where the temperature sufficient to cause polymerization is between 100° C. and 300° C.

* * * * *